United States Patent
Gandhi et al.

(10) Patent No.: US 11,618,548 B2
(45) Date of Patent: Apr. 4, 2023

(54) SHEAR HARDENING MATERIAL TO SUPPRESS FLUTTER IN INFLATABLE WINGS

(71) Applicant: Toyota Motor Engineering & Manufacturing North America, Inc., Plano, TX (US)

(72) Inventors: Umesh N. Gandhi, Farmington Hills, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 53 days.

(21) Appl. No.: 17/165,186

(22) Filed: Feb. 2, 2021

(65) Prior Publication Data
US 2022/0242552 A1    Aug. 4, 2022

(51) Int. Cl.
| | | |
|---|---|---|
| *B64C 3/30* | (2006.01) | |
| *B64C 23/00* | (2006.01) | |
| *B64C 37/00* | (2006.01) | |

(52) U.S. Cl.
CPC .............. *B64C 3/30* (2013.01); *B64C 23/00* (2013.01); *B64C 37/00* (2013.01)

(58) Field of Classification Search
CPC ..... B64C 3/00; B64C 3/30; B64C 3/56; F16F 9/53; F16F 13/30; F16F 13/305
See application file for complete search history.

(56) References Cited

U.S. PATENT DOCUMENTS

| | | | | | |
|---|---|---|---|---|---|
| 2,886,265 | A | * | 5/1959 | Ritter | ........................ B64C 3/30 244/119 |
| 3,957,232 | A | * | 5/1976 | Sebrell | ...................... B64C 3/30 428/188 |

(Continued)

FOREIGN PATENT DOCUMENTS

| | | | | | |
|---|---|---|---|---|---|
| CN | 109372939 | A | * | 2/2019 | ............. B32B 15/01 |
| EP | 3056760 | A1 | * | 8/2016 | ............. B64C 25/58 |

(Continued)

OTHER PUBLICATIONS

Mehdi Eshaghi, "The effect of magnetorheological fluid and aerodynamic damping on the flutter boundaries of MR fluid sandwich plates in supersonic airflow," Aug. 2020, European Journal of Mechanics—A/Solids, vol. 82. (Year: 2020).*

(Continued)

*Primary Examiner* — Joshua J Michener
*Assistant Examiner* — Ryan Andrew Yankey
(74) *Attorney, Agent, or Firm* — Christopher G. Darrow; Darrow Mustafa PC

(57) ABSTRACT

A reinforced, foldable component for an aircraft is provided, configured to stabilize a high frequency aeroelastic fluttering movement. The reinforced component may include a frame structure defining at least one air chamber, and a plurality of sealed compartments. A shear thickening fluid is disposed in at least one of the sealed compartments, exhibiting a decreasing viscosity responsive to an impact force. The frame structure may define one of an inflatable wing structure, a fairing structure, an aileron structure, and a stabilizer structure, and the like. The foldable component may include an exterior layer with an exterior surface exposed to an external environment and an interior layer adjacent the at least one air chamber, wherein the plurality of sealed compartments are disposed between the exterior layer and the interior layer. The exterior layer or the interior layer may (Continued)

include an impact-resistant fabric layer including a shear thickening material.

17 Claims, 5 Drawing Sheets

(56) References Cited

U.S. PATENT DOCUMENTS

| | | |
|---|---|---|
| 7,448,678 B2 | 11/2008 | Browne et al. |
| 8,342,447 B2 | 1/2013 | Etling |
| 9,187,191 B1 * | 11/2015 | Jensen .................. B64G 1/242 |
| 9,303,709 B2 | 4/2016 | Manes et al. |
| 9,453,550 B2 | 9/2016 | Smith et al. |
| 10,207,665 B2 | 2/2019 | Gandhi et al. |
| 2012/0204451 A1 | 8/2012 | De Roode et al. |
| 2016/0310822 A1 | 10/2016 | Kender et al. |
| 2017/0210458 A1 | 7/2017 | Tothill et al. |
| 2018/0049501 A1 * | 2/2018 | Boland ................ A42B 3/0473 |
| 2020/0148399 A1 * | 5/2020 | de Jong et al. ........ B64G 1/402 |

FOREIGN PATENT DOCUMENTS

| | | | | |
|---|---|---|---|---|
| GB | 2162139 A * | 1/1986 | ............... | B64C 3/00 |
| GB | 2290769 A * | 1/1996 | ............... | B64C 3/30 |
| KR | 20150107987 A * | 10/2015 | ............... | B64G 6/00 |
| WO | WO-2011087724 A2 * | 7/2011 | ............... | B64C 3/30 |
| WO | WO-2020018539 A1 * | 1/2020 | ............ | B32B 27/08 |

OTHER PUBLICATIONS

Raja, S. et al., "Active Control of Wing Flutter Using Piezoactuated Surface," Journal of Aircraft, vol. 44, No. 1, Jan. 2007, pp. 71-80.

* cited by examiner

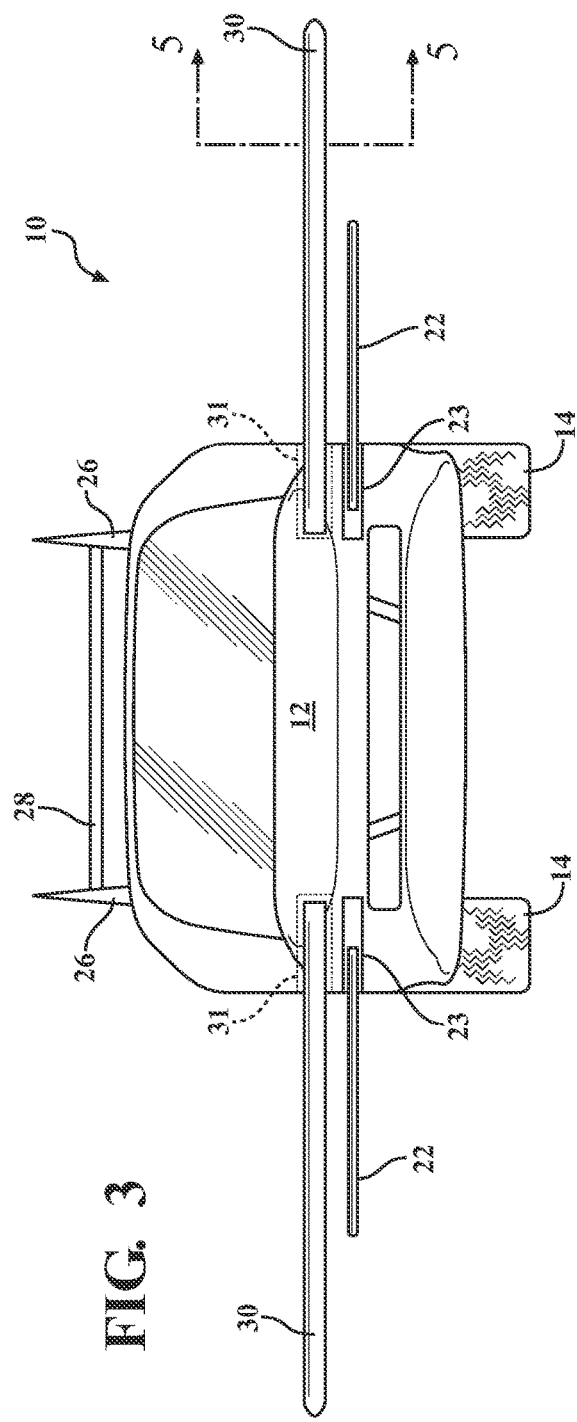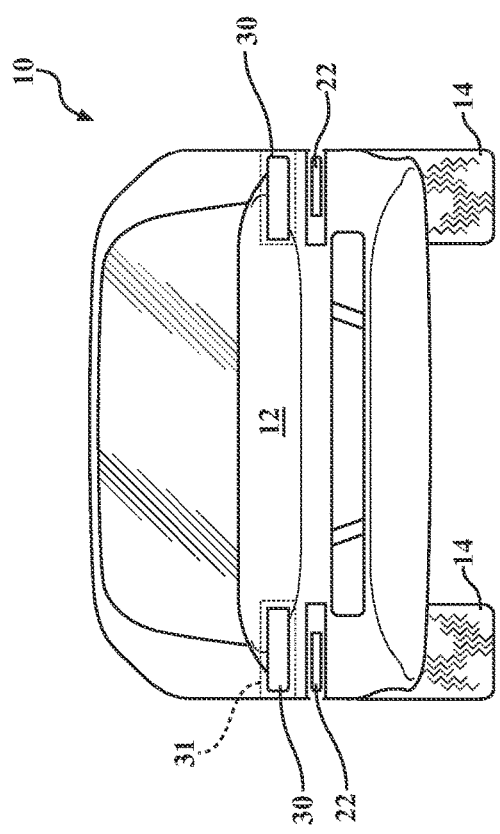

FIG. 5A
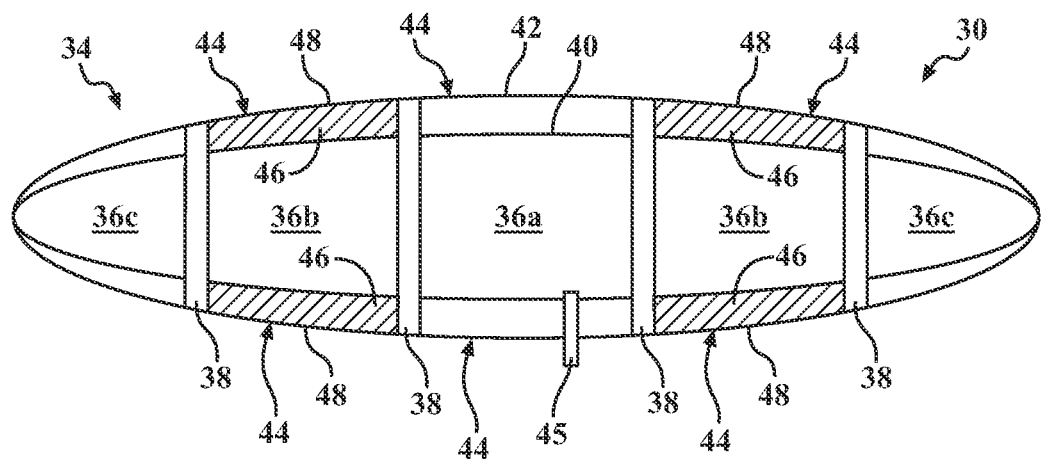
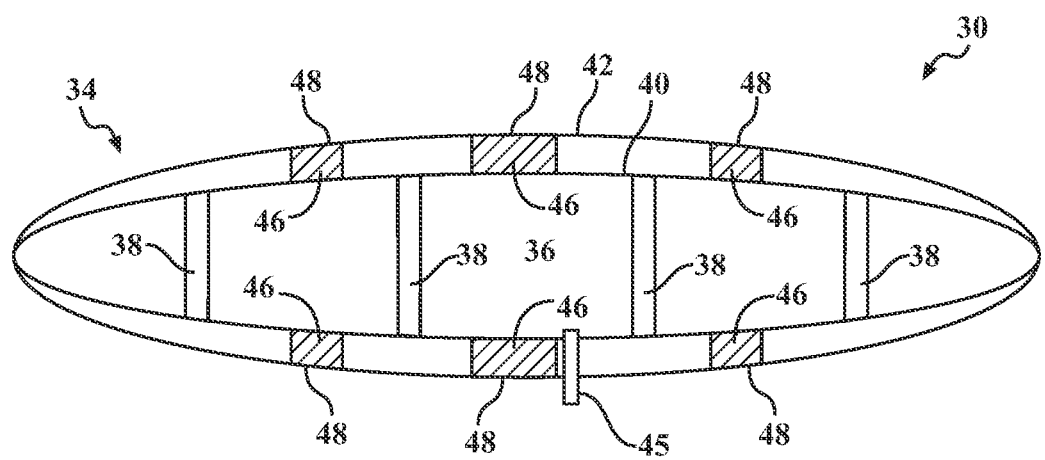
FIG. 5B

SHEAR HARDENING MATERIAL TO SUPPRESS FLUTTER IN INFLATABLE WINGS

TECHNICAL FIELD

The present disclosure generally relates to aircraft structures and, more particularly, to foldable and/or inflatable aircraft structures, such as wings, incorporating a shear thickening fluid to suppress fluttering or unstable movements.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Various types of vehicles are contemplated for use in air transportation, including fixed wing aircraft as well as aerocars. An aerocar vehicle, or roadable aircraft, may be defined as a vehicle that may be driven on roads as automobiles, and may also take off, fly, and land as an aircraft. Such mobility for aerocars, however, may require various tradeoffs in order to facilitate operations in both a flight mode and a roadable mode. Typically, the body of a land vehicle is relatively short to facilitate road maneuverability and parking, whereas a body of an aircraft is relatively long to facilitate flight stability and control. In certain aerocars, the wings can be provided as inflatable wings, which can be deflated, folded, and stowed when in the roadable mode. Foldable and/or inflatable wings may provide ease of stowage, however, their stability in the air may not be the same as that of fixed wing aircraft.

Accordingly, it would be desirable to provide an improved stability and strength for foldable and/or inflatable wings during a flight mode, while maintaining their ability for compact stowage.

SUMMARY

This section provides a general summary of the disclosure, and is not a comprehensive disclosure of its full scope or all of its features.

In various aspects, the present teachings provide a reinforced, foldable component for an aircraft, configured to stabilize a high frequency aeroelastic fluttering movement. The reinforced component may include a frame structure defining at least one air chamber, and a plurality of sealed compartments. A shear thickening fluid is disposed in at least one of the plurality of sealed compartments, the shear thickening fluid exhibiting a decreasing viscosity responsive to an impact force. The frame structure may define one of an inflatable wing structure, a fairing structure, an aileron structure, and a stabilizer structure, and the like. The foldable component may include an exterior layer with an exterior surface exposed to an external environment and an interior layer adjacent the at least one air chamber, wherein the plurality of sealed compartments are disposed between the exterior layer and the interior layer. The exterior layer or the interior layer may include an impact-resistant fabric layer including a shear thickening material.

In other aspects, the present teachings provide an inflatable, folding aircraft wing. The inflatable aircraft wing includes a frame structure with a plurality of spaced-apart baffles extending in a direction along a length dimension of the inflatable aircraft wing. The frame structure may define at least one air chamber, and a plurality of sealed compartments disposed around the at least one air chamber. A shear thickening fluid is disposed in at least one of the plurality of sealed compartments, where the shear thickening fluid exhibits a decreasing viscosity responsive to an impact force. The inflatable aircraft wing is configured to stabilize a high frequency aeroelastic fluttering movement.

In still other aspects, the present teachings provide an aircraft including a body, a power generating system, and a pair of inflatable wings, each inflatable wing includes a frame structure including a plurality of spaced-apart baffles extending in a direction along a length dimension of the inflatable wing. The frame structure defines at least one air chamber, and a plurality of sealed compartments disposed around the at least one air chamber. A shear thickening fluid is disposed in at least one of the plurality of sealed compartments. The shear thickening fluid exhibits a decreasing viscosity responsive to an impact force, wherein each inflatable wing is configured to stabilize a high frequency aeroelastic fluttering movement.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 3 is a front plan view of the aerocar of FIG. 2, illustrating the wings, empennage, and canards in an extended position for use as an aircraft;

FIG. 4 is a front plan view of the aerocar of FIG. 2, illustrating the wings, empennage, and canards in a folded or retracted position, stowed in a body portion, for use as a road vehicle;

FIG. 5A is a cross sectional view of the wing taken along the line 5-5 of FIG. 3, according to a first aspect of the present technology;

FIG. 5B is a cross sectional view of the wing taken along the line 5-5 of FIG. 3, according to a second aspect of the present technology.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides a reinforced, movable and/or foldable component for an aircraft. In various aspects, a shear thickening material is used as a reinforcement, used with the component, such that it is configured to minimize and/or stabilize any high frequency aeroelastic fluttering movement of the component. In aspects where the reinforced component is an inflatable structure, such as an inflatable wing structure, it may include a frame structure defining at least one air chamber, and a plurality of sealed compartments. In various aspects, a shear thickening fluid may be disposed in at least one of the sealed compartments, exhibiting a decreasing viscosity responsive to an impact force. As an alternative to an inflatable wing structure, the frame structure also may define one of, a fairing structure, an aileron structure, and a stabilizer structure, and the like. The reinforced component may include an exterior layer, or shell, with an exterior surface exposed to an external environment and an interior layer adjacent the at least one air chamber, wherein the plurality of sealed compartments are disposed between the exterior layer and the interior layer. The exterior layer or the interior layer may include an impact-resistant fabric layer, also optionally including a shear thickening material.

Figure 1:
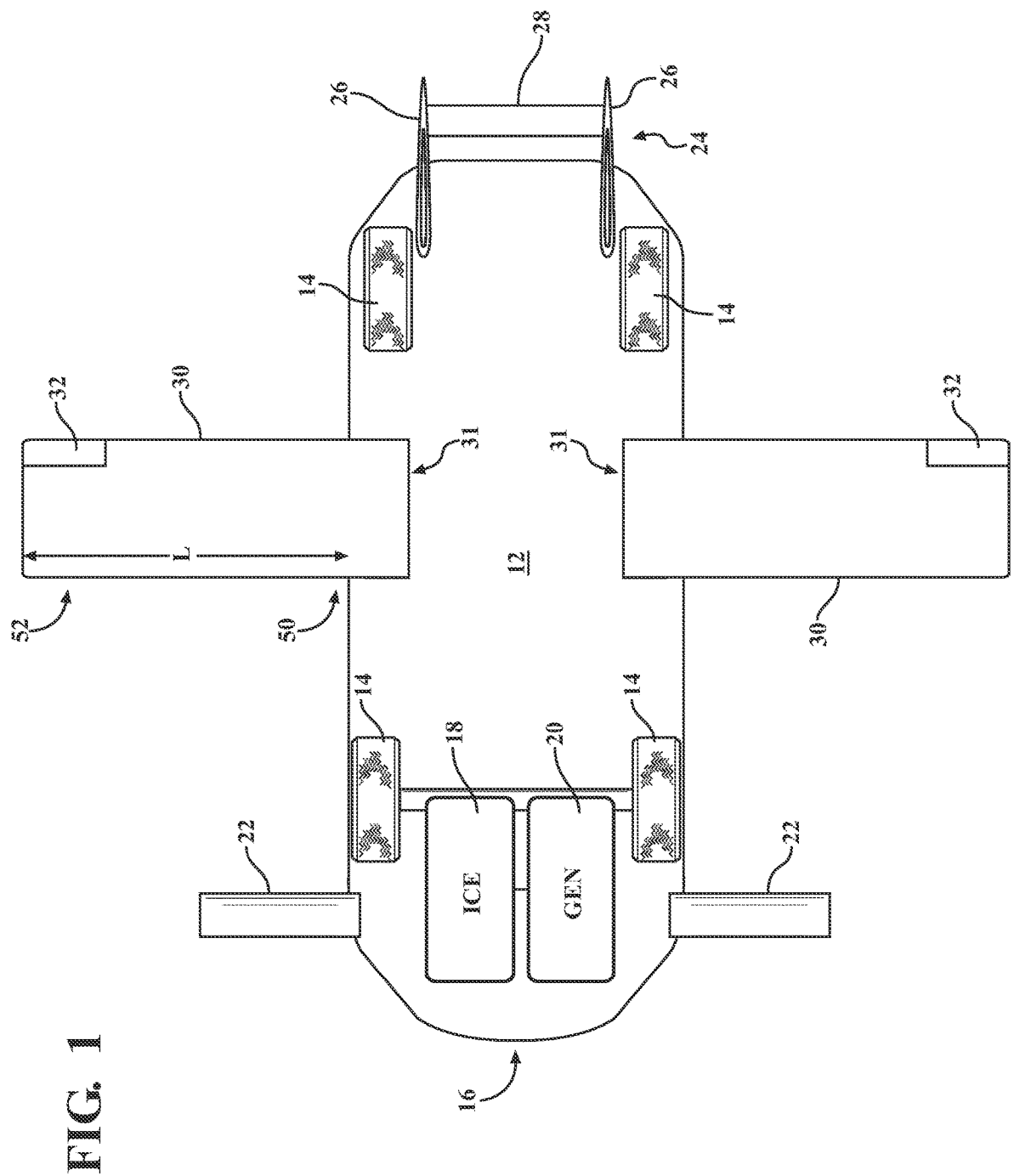
FIG. 1 illustrates an exemplary schematic illustration of an aerocar including wheels for road use and reinforced wings according of the present technology.

FIG. 1 is a schematic illustration and shows an example of an aerocar type of vehicle 10 in which the reinforced components of the present technology can be utilized. As used herein, "vehicle" means any form of motorized or non-motorized transport, including manually driven or partially or fully autonomously controlled. While arrangements will be described herein with respect to aerocar and/or aircraft vehicles, it will be understood that embodiments are not limited to passenger-carrying aircraft or vehicles. In certain implementations, the vehicle 10 may be a glider or drone, manned or unmanned, and the like.

Figure 2:
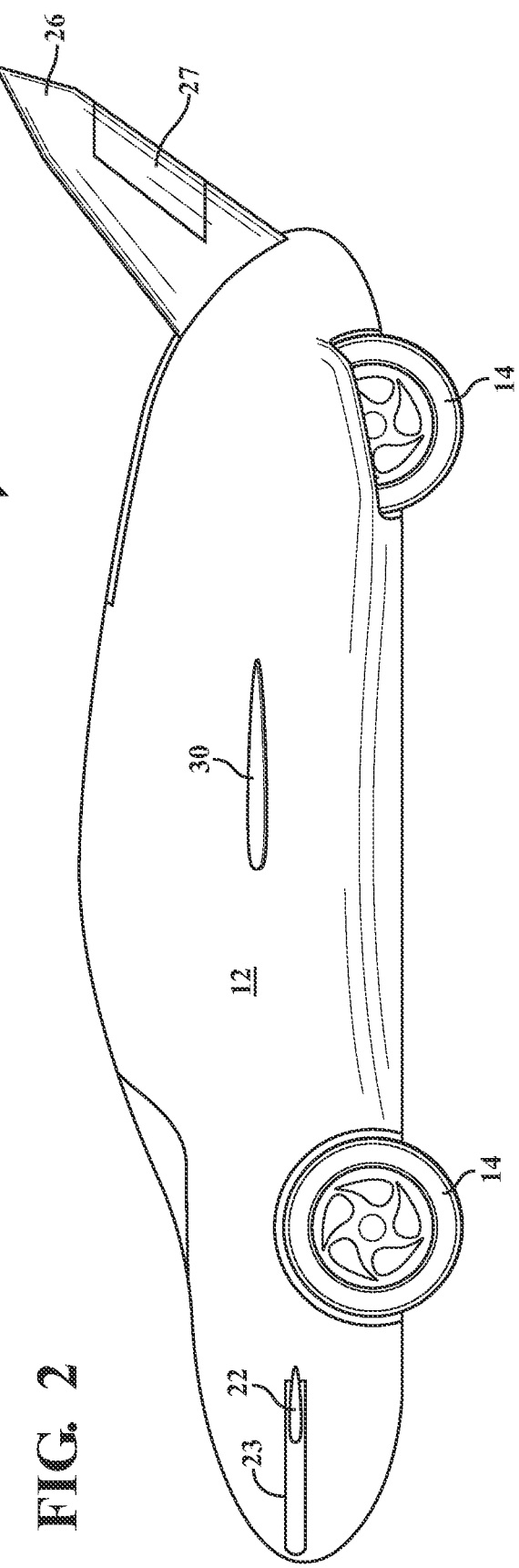
FIG. 2 is a side plan view of an exemplary aerocar of the type illustrated in FIG. 1.

The exemplary aerocar vehicle 10 may be operable in a flight mode (FIGS. 1, 2, 3) and a roadable mode (FIG. 4). FIG. 2 is a side plan view of an exemplary aerocar vehicle 10 of the type illustrated in FIG. 1. FIG. 3 is a front plan view of the aerocar vehicle 10 of FIG. 2, illustrating wings, an empennage, and canards in an extended position for use as an aircraft. FIG. 4 is a front plan view of the aerocar vehicle 10 of FIG. 2, illustrating the wings, empennage, and canards in a retracted position, stowed in a body portion, for use as a road vehicle.

With reference to FIGS. 1-4, the aerocar vehicle 10 generally includes a body 12 with a plurality of wheels 14 (including at least one steerable wheel and at least one drive wheel), a power generating system 16 that can include an internal combustion engine 18 and/or an electrical generator system 20, a propulsor system (not specifically shown), a pair of canards 22, an empennage 24 system with stabilizers 26, rudders 27, and an elevator 28, and a wing system that may include folding and/or inflatable wings 30 and optional aileron structures 32 or other flaps, and fairing structures. It should be appreciated that although particular systems and subsystems are separately defined, each or any of the subsystems may be combined or segregated.

The body 12 generally provides seating for the operator and optional passengers and/or cargo. In the example shown, the body 12 can be supported upon the plurality of wheels 14 for operations in a roadable mode (FIG. 4). The canards 22, empennage 24, and the folding and/or inflatable wings 30 may be readily stowable within the body 12 to facilitate a low profile and stylish design potential when in the roadable mode that also does not interfere with the side and aft view for a driver. For example, the inflatable wings 30 may be stored (in a deflated and/or folded state) in an interior area 31 of the body, In one example, a wingspan of about eighteen to twenty feet may be provided for a body 12 that is about six feet in width with a takeoff gross weight of about 3200 lbs. Although depicted with a particular configuration and shape in the disclosed non-limiting embodiment, it should be understood that the concepts described herein are not limited to only those illustrated.

The pair of canards 22 is shown located forward of each of the steerable wheels 14. Each canard 22 may be an all moving surface that pitches about a respective axis to facilitate pitch and roll control of the vehicle 10. Each canard 22 may be rotatable about an axis for at least partial stowage within a cavity 23 the body 12. In this regard, each canard 22 may be rotatable about an axis for a rotational distance of about one hundred and thirty-five (135) degrees between a stowed roadable mode and a deployed flight mode. It should be appreciated that other stowage arrangements such as a sliding, telescoping, folding, or other arrangement may be used.

The empennage 24 generally includes port and starboard side vertical stabilizer structures 26 and an elevator 28 there between. As shown in FIG. 2, the vertical stabilizer structures 26 may include a rudder 27 to facilitate yaw control, and may include other fairing structures. The elevator 28 may be an all moving surface that pitches about an axis to facilitate pitch control of the vehicle 10.

FIG. 5A is a cross sectional view of a reinforced, foldable and/or inflatable wing 30 taken along the line 5-5 of FIG. 3, according to a first aspect of the present technology. While shown and described as a wing structure 30, or inflatable aircraft wing, it should be understood that the cross sectional view of FIG. 5A (as well as FIG. 5B) could also be illustrative of a representative canard structure 22, a stabilizer structure 26, or elevator component 28, or even just a portion of a wing structure, such as an aileron structure 32 or other flap portion. It should be understood that the wing structure 30 may have a variety of different shapes and configurations, and the illustrations provided herein are only provided as non-limiting examples in order to illustrate the broad concepts of the present technology. For simplicity, the mechanical means used in inflating or deflating the inflatable wings 30 are not specifically provided, but should be understood by those of ordinary skill in the art.

In various aspects, the reinforced wing 30 generally includes a frame structure 34, which may include one or more different components that define at least one air chamber 36. As shown in FIG. 5A, there may be a plurality of air chambers 36a, 36b, 36c in fluid communication with one another. The design of the frame structure 34 of FIG. 4A may include a plurality of spaced-apart baffles 38 that generally extend along a length dimension. Additional baffles or support members may also extend in a width direction. Various baffles 38 may cooperate with interior and exterior layers 40, 42, or shell components, to define a plurality of sealed compartments 44. Depending on the design, the baffles 38 of the frame structure 34 may provide selective fluid communication between the plurality of air chambers 36a, 36b, 36c. In various aspects, one or more pressure relief valve 45 may be included, providing selective fluid communication between the at least one air chamber 36 and an external environment.

The present technology provides the inclusion of a shear hardening material, such as a shear thickening fluid 46, disposed in at least one of the plurality of sealed compartments 44. The shear hardening material, or fluid 46, is provided to reinforce the aircraft component, in particular, a wing 30. As specifically shown in FIG. 5A, the shear thickening fluid 46 is provided in 4 different sealed compartments 44; the number of sealed compartments 44 and their location may vary as desired. The sealed compartments 44 may each have various dimensions, sizes, and shapes, and can generally extend across an entirety of a length dimension, L, of the wing 30, for example from a proximal end 50 next to the body 12 to a distal end 52 (FIG. 1). Certain of the sealed compartments 44 may be provided with more or less of the shear thickening fluid 46 than other sealed compartments 44, depending upon the desired or required need for the particular portion of the wing 30 to stabilize a high frequency, aeroelastic fluttering movement during flight operations. As will be explained in more detail below, different types of shear thickening fluids 46 may be used in the different sealed compartments 44 if it is desired to customize aspects of the reinforcement.

FIG. 5B is a cross sectional view of the wing taken along the line 5-5 of FIG. 3, according to a second aspect of the present technology. As shown in FIG. 5B, the frame structure 34 may generally include an exterior layer 42, or shell, with an exterior surface that is exposed to an external environment. An interior layer 40, or shell, may be provided adjacent at least one air chamber 36. In certain aspects, for example, an innermost surface of the interior layer 40 may define at least one region of the air chamber 36. Spaced apart baffles 38 may also be provided as part of the frame structure 34. Distinct from FIG. 5A, where the sealed compartments 44 were defined at least partially by the interior layer 40, exterior layer 42, and baffles 38, FIG. 5B provides a plurality of sealed compartments 48 generally disposed between the interior layer 40 and the exterior layer 42, such that the sealed compartments are disposed in locations around the at least one air chamber 36. As noted above with respect to the sealed compartments 44 of FIG. 5A, the sealed compartments 48 of FIG. 5B may also be provided with different dimensions, and may generally extend along an entirety of the length dimension L, of the wing 30.

In various aspects of both FIGS. 5A and 5B, at least one of the interior layer 40 and exterior layer 42 of the frame structure 34 may be, or further include, an outermost surface made at least in part of an outer fabric layer, such as a high strength impact-resistant fabric layer, which may additionally or alternatively include a shear thickening material. In one non-limiting example, the outer fabric layer may include any suitable material-supporting substrate, such as a textile fabric, woven material, or even a sand paper (sand includes silica and quartz), where a shear thickening material or fluid can be integrated with the outer fabric layer, for example, using a lamination process and/or using thermoplastic material sheets/polymers to retain the shear thickening fluid with the fabric layer. In addition to the above, examples of the outer fabric layer may include polymer fabrics, including nylon fibers, and ultra-high molecular weight polyethylene (UHMWPE) such as commercially available DYNEEMA® fabrics and unidirectional laminates. The outer fabric layer may be saturated with a shear thickening fluid that is diluted, for example, in ethanol. The saturated fabric may then be placed in an oven, or the like, where the ethanol is subsequently evaporated. This results in an outer fabric layer with a shear thickening fluid permeating through the textile fabric, polymer fabric, woven material, sand paper, and the like.

According to various aspects of the present technology, each of the plurality of sealed compartments 44, 48, which may also be referred to as sealed chambers or pockets, may be filled with a shear hardening/thickening material and, in particular, a shear thickening fluid 46. Different sealed compartments 44, 48 may not only be provided with different shapes and sizes, they may also be provided with different compositions or types of shear thickening fluids in order to provide different energy absorbing properties. As used herein, the term "shear thickening fluid" (or "STF") is meant to refer to a fluid that has an increasing viscosity when dynamically sheared or stressed, which is normally but not necessarily, reversible when the shear or stress condition is relaxed. A common non-limiting example may be a dilatant or rheopectic fluid. Typically, it is understood that a dilatant shear thickening fluid has a viscosity that increases with increasing shear rate, whereas a rheopectic shear thickening fluid has a viscosity that increases with the duration of an applied shear stress. At low rates, shear thickening fluids have low viscosity and may act as a lubricant. However, when an impact is applied at an increased shear rate, the fluid adopts a solid-like state and, due to a rapid increase in viscosity, becomes less penetrable. Shear thickening systems may be particle based or non-particle based. For particle based shear thickening fluids, particles are commonly added to a fluid using low speed mixer.

Thus, in various aspects of the present technology, shear thickening fluids may include, by way of a non-limiting example, colloidal dispersions of fine particles inside of a liquid. As used herein, "fine particles" may include particles that have a maximum size dimension of less than about 3 microns, in other instances the maximum size dimension may be less than about 2 microns, or less than 1 micron. According to some aspects, the fine particles may be organic, including for example, cornstarch, latex particles, polyethylene oxide. In other aspects, the fine particles may be inorganic, including for example, silica, and the like. In still other aspects, the fine particles may include a combination of organic and inorganic material.

With respect to examples of the shear thickening fluid, in various aspects the fluid may include: a mixture of polyethylene oxide and petroleum sulfonate; gypsum pastes; colloidal silica particle dispersions; colloidal latex dispersions; polyethylene glycol solutions or mediums; starch slurries; and the like. It should also be understood that the fine particles may also be of different shapes and sizes, which may also influence the rheological behavior of the mixture. For example, is has been understood that the shear thickening imparted by different shapes of the fine particles over a range of shear rates from $100\ s^{-1}$ to $300\ s^{-1}$ is generally that rod shapes>plates>grains>spheres. In some aspects, the fine particles are present in various predetermined quantities so as to impart a specified shear thickening behavior to the fluid. In one non-limiting example, the shear thickening fluid may be a hydrophilic, concentrated suspension of inorganic particles in a glycol medium, for example, STF-SG, commercially available from STF Technologies LLC of Delaware. The shear thickening fluid may optionally be used with a diluent to create a fluid with specifically tailored critical shear rates at a given level of stress.

Figure 6:
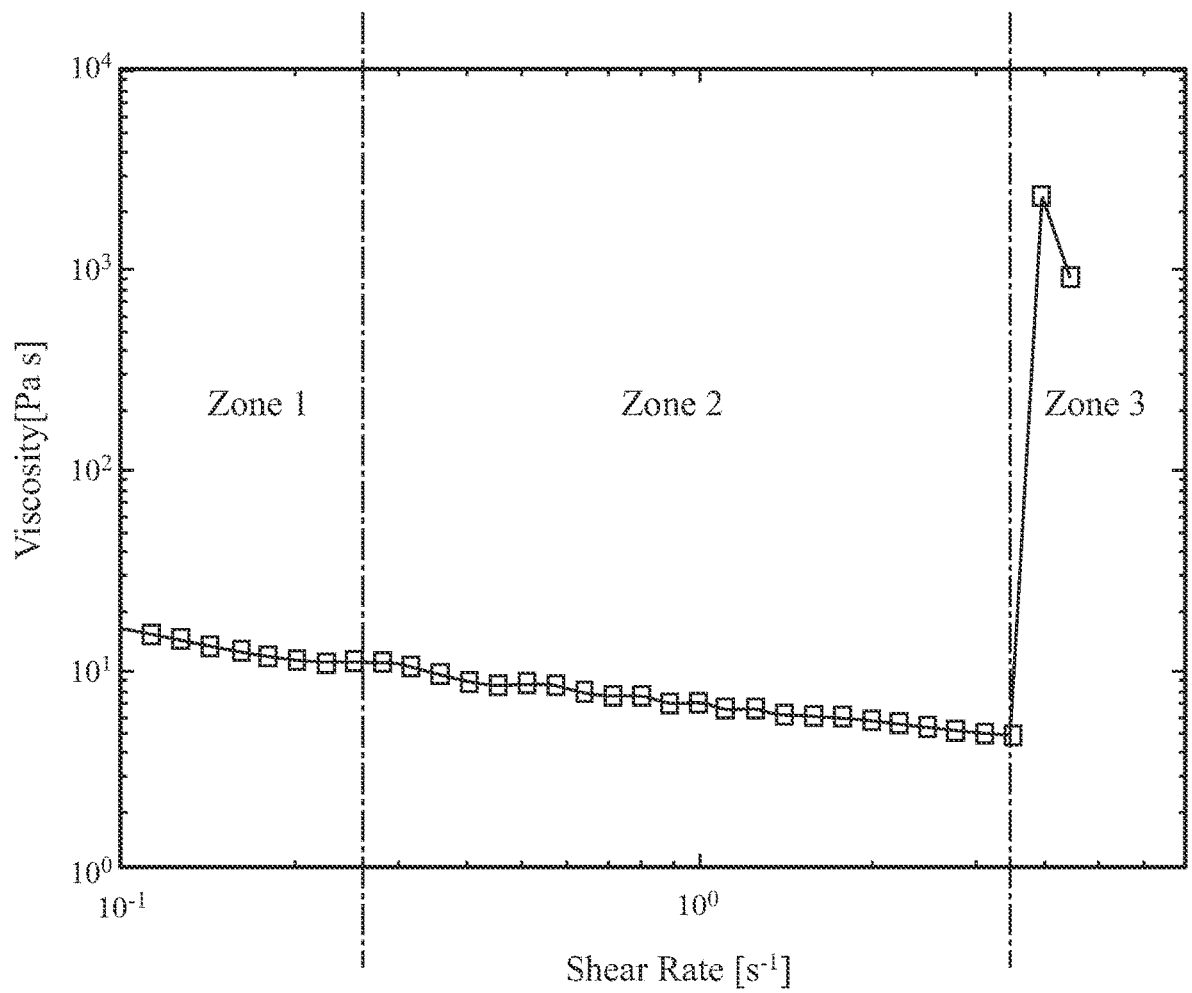
FIG. 6 illustrates a plot of shear rate versus flow viscosity for one exemplary shear thickening fluid useful with the present technology.

FIG. 6 illustrates a plot of shear rate versus flow viscosity for one exemplary shear thickening fluid with silica particles suspended therein that may be useful with the present technology. The size of the silica particle diameters may range, beginning in the low nanometer size range and larger. In the example of FIG. 6, the shear thickening fluid is prepared with 500 nm diameter spherical silica particles commercially available from Nippon Shokubai Co., under reference name KEP50, mixed in a polyethylene glycol medium having with an average molecular weight of 200 g/mol (PEG200), commercially available from VWR International of Pennsylvania. The silica may be present at about 60% by weight. The silicone used for encapsulation is a flexible (shore hardness 18) polycondensated silicone (RHODORSIL RTV-3318), commercially available from Bluestar Silicones of South Carolina.

As shown, the shear thickening fluid exhibits a decreasing viscosity responsive to an impact force exerting a first range of shear rates up to a predetermined rate, and subsequently exhibits an increasing viscosity responsive to an impact force exerting a second range of higher shear rates higher than the predetermined rate. For illustrative purposes only, FIG. 6 is separated and labeled with three zones. Zone 1 is meant to represent shear rates that may commonly be exhibited in a first, low range of shear stress, which may permit the wing component to be slowly folded into a storage position. Zone 2 is meant to represent shear rates that may commonly be exhibited in a second, medium range of shear stress, which may result from being in an extended position. Zone 3 is meant to represent shear rates that may commonly be exhibited in a third, high range of shear stress, which may result from an impact or quick movement. In Zones 1 and 2, the viscosity of the shear thickening fluid slowly decreases with an increasing shear rate, and the shear thickening fluid is in a liquid state, with fluidic properties. Upon passing the predetermined shear rate, which is the shear rate that transitions from Zone 2 to Zone 3, the shear thickening fluid stiffens to a solid-like state and exhibits an increasing viscosity responsive to an impact force exerting greater than the predetermined shear rate. Shortly after receiving the impact, the shear thickening fluid may relax and return to a liquid state, with fluidic type properties.

According to the present technology, the use of the shear thickening materials and fluids are generally provided to reinforce and increase the rigidity of various aircraft components that may be more susceptible to flight flutter, or a fluttering type of movement at certain frequencies, which may be based on speed, wind, turbulence, and other considerations. Fluttering movement, which may be referred to as a high frequency aeroelastic fluttering, may be especially noticeable with foldable, movable, and/or inflatable aircraft components. Such components may include the wing structures, canards, fairing structures, aileron and flap structures, stabilizer structures, rudders, and the like. Aeroelastic fluttering involves the unfavorable interaction of aerodynamic, elastic, and inertia forces on structures to produce a potentially unstable oscillation, which could ultimately lead to some type of failure. In various aspects, the reinforcing designs of the present technology may be configured to reduce, minimize, and/or stabilize an aeroelastic fluttering movement. For example, when the fluttering movement causes the shear thickening fluid to become rigid, or have a shear rate in Zone 3 of FIG. 6, it thereby functions to reinforce the aircraft component. In many aspects, the rigidity of the reinforced components that is provided by the shear thickening fluid is able to stabilize and minimize such aeroelastic fluttering movement. In various aspects, the aeroelastic fluttering movement occurs at a frequency of from about 8 Hz to about 40 Hz, and even up to about 60 Hz. The specific frequency of the fluttering movement may vary based upon various structural features of the reinforced components and the overall design of the reinforced components. In various aspects, the reinforced components, such as an inflatable aircraft wing described herein, is configured to stabilize an aeroelastic fluttering movement of a frequency of from about 8 to about 60 Hz.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:
1. A reinforced component for an aircraft, the reinforced component comprising:
   a frame structure defining:
      a plurality of spaced-apart baffles;

a shell comprising an interior layer with an outermost surface and an innermost surface, and an exterior layer with an outermost surface and an innermost surface;

at least one air chamber disposed within the innermost surface of the interior layer of the shell; and a plurality of sealed compartments disposed between the plurality of spaced-apart baffles, the outermost surface of the interior layer of the shell and the innermost surface of the exterior layer of the shell; and a shear thickening fluid disposed in at least one of the plurality of sealed compartments, the shear thickening fluid exhibiting a decreasing viscosity responsive to an impact force, wherein the reinforced component is configured to stabilize a high frequency aeroelastic fluttering movement.

2. The reinforced component according to claim 1, wherein the frame structure is foldable and defines an inflatable foldable wing structure.

3. The reinforced component according to claim 1, wherein at least one of the exterior layer and the interior layer comprises an impact-resistant fabric layer including a shear thickening material.

4. The reinforced component according to claim 1, further comprising a pressure relief valve in fluid communication with the at least one air chamber.

5. The reinforced component according to claim 1, wherein the frame structure defines one of an inflatable wing structure, a fairing structure, an aileron structure, and a stabilizer structure.

6. The reinforced component according to claim 1, wherein the shear thickening fluid comprises silica particles in a polyethylene glycol medium.

7. An inflatable aircraft wing, comprising:
a frame structure including a plurality of spaced-apart baffles extending in a direction along a length dimension of the inflatable aircraft wing, the frame structure defining:
a shell comprising an interior layer with an outermost surface and an innermost surface, and an exterior layer with an outermost surface and an innermost surface;
at least one air chamber disposed within the innermost surface of the interior layer of the shell; and
a plurality of sealed compartments disposed around the at least one air chamber between the plurality of spaced-apart baffles, the outermost surface of the interior layer of the shell and the innermost surface of the exterior layer of the shell; and
a shear thickening fluid disposed in at least one of the plurality of sealed compartments, the shear thickening fluid exhibiting a decreasing viscosity responsive to an impact force,
wherein the inflatable aircraft wing is configured to stabilize a high frequency aeroelastic fluttering movement.

8. The inflatable aircraft wing according to claim 7, wherein at least one of the exterior layer and the interior layer comprises an impact-resistant fabric layer including a shear thickening material.

9. The inflatable aircraft wing according to claim 7, further comprising a pressure relief valve in fluid communication with the at least one air chamber.

10. The inflatable aircraft wing according to claim 7, wherein the inflatable aircraft wing is configured to stabilize an aeroelastic fluttering movement of a frequency of from about 8 to about 60 Hz.

11. The inflatable aircraft wing according to claim 7, wherein the frame structure is foldable, configured for stowage within a body portion of an aircraft.

12. An aircraft, comprising:
a body;
a power generating system;
a pair of inflatable wings, each inflatable wing including:
a frame structure including a plurality of spaced-apart baffles extending in a direction along a length dimension of the inflatable wing, the frame structure defining:
a shell comprising an interior layer with an outermost surface and an innermost surface, and an exterior layer with an outermost surface and an innermost surface;
at least one air chamber disposed within the innermost surface of the interior layer of the shell; and
a plurality of sealed compartments disposed around the at least one air chamber between the plurality of spaced-apart baffles, the outermost surface of the interior layer of the shell and the innermost surface of the exterior layer of the shell; and
a shear thickening fluid disposed in at least one of the plurality of sealed compartments, the shear thickening fluid exhibiting a decreasing viscosity responsive to an impact force,
wherein each inflatable wing is configured to stabilize a high frequency aeroelastic fluttering movement.

13. The aircraft according to claim 12, wherein at least one of the exterior layer and the interior layer comprises an impact-resistant fabric layer including a shear thickening material.

14. The aircraft according to claim 12, further comprising a pressure relief valve in fluid communication with each respective air chamber.

15. The aircraft according to claim 12, wherein the frame structure of each inflatable wing is foldable, such that each inflatable wing is stowable in the body of the aircraft.

16. The aircraft according to claim 12, wherein each inflatable wing is configured to stabilize an aeroelastic fluttering movement of a frequency of from about 8 to about 60 Hz.

17. The aircraft according to claim 12, wherein the shear thickening fluid comprises silica particles in a polyethylene glycol medium.

* * * * *